(12) United States Patent
Young et al.

(10) Patent No.: US 10,167,062 B2
(45) Date of Patent: Jan. 1, 2019

(54) CABLE LOADING STRUCTURE

(71) Applicant: JDR Cable Systems Ltd., Littleport, Ely Cambridgeshire (GB)

(72) Inventors: James Young, Littleport (GB); Philip Ward, Littleport (GB); Jeremy Featherstone, Littleport (GB)

(73) Assignee: JDR Cable Systems Ltd., Littleport, Ely Cambridgeshire (GB)

( * ) Notice: Subject to any disclaimer, the term of this patent is extended or adjusted under 35 U.S.C. 154(b) by 0 days.

(21) Appl. No.: 15/113,555

(22) PCT Filed: Dec. 12, 2014

(86) PCT No.: PCT/GB2014/053685
§ 371 (c)(1),
(2) Date: Jul. 22, 2016

(87) PCT Pub. No.: WO2015/110778
PCT Pub. Date: Jul. 30, 2015

(65) Prior Publication Data
US 2017/0001691 A1 Jan. 5, 2017

(30) Foreign Application Priority Data
Jan. 23, 2014 (GB) .................... 1401169.6

(51) Int. Cl.
*B63B 35/04* (2006.01)
*F16L 1/20* (2006.01)
*B63B 27/36* (2006.01)

(52) U.S. Cl.
CPC .............. *B63B 35/04* (2013.01); *B63B 27/36* (2013.01); *F16L 1/203* (2013.01)

(58) Field of Classification Search
CPC ......... B63B 27/36; B63B 35/04; B63B 35/03; F16L 1/205; H02G 1/10; H02G 1/06
See application file for complete search history.

(56) References Cited

U.S. PATENT DOCUMENTS

| | | | | |
|---|---|---|---|---|
| 4,022,201 A * | 5/1977 | Diggs | ................ | B63C 11/24 128/201.11 |
| 4,117,692 A | 10/1978 | Oberg | | |
| 4,260,288 A * | 4/1981 | Ellers | ................ | F16L 1/203 405/158 |
| 2005/0281620 A1* | 12/2005 | Hoffmann | ............... | B63B 35/03 405/168.1 |
| 2011/0274518 A1* | 11/2011 | Pose | ................ | B63B 27/20 414/139.4 |

(Continued)

FOREIGN PATENT DOCUMENTS

| | | |
|---|---|---|
| EP | 0013324 | 7/1980 |
| EP | 0302038 | 2/1989 |

(Continued)

*Primary Examiner* — Carib A Oquendo
(74) *Attorney, Agent, or Firm* — Stetina Brunda Garred & Brucker (57) ABSTRACT

The invention provides a floatable cable loading facility (3) for receiving and controlling a cable storage tank (1) which can be used without providing additional infrastructure on a quay or vessel. The cable loading facility is able to receive and retain a tank (1) while rotating it to allow loading and unloading of the cable.

16 Claims, 8 Drawing Sheets

(56) References Cited

U.S. PATENT DOCUMENTS

| | | | |
|---|---|---|---|
| 2013/0051920 A1* | 2/2013 | Roodenburg | B63B 35/03 405/168.3 |
| 2014/0053449 A1* | 2/2014 | Martin | A01K 97/12 43/17 |
| 2015/0175244 A1* | 6/2015 | Webster | B63B 35/04 114/331 |
| 2015/0298936 A1* | 10/2015 | Haldorsen | B65H 67/06 242/397.3 |
| 2015/0307317 A1* | 10/2015 | Grimmond | B65H 75/4402 242/390 |

FOREIGN PATENT DOCUMENTS

| | | |
|---|---|---|
| GB | 1081268 | 8/1967 |
| NL | 1009460 | 7/1998 |
| WO | 2009022170 | 2/2009 |

\* cited by examiner

CABLE LOADING STRUCTURE

CROSS-REFERENCE TO RELATED APPLICATIONS

The present application claims priority to PCT International Application No. PCT/GB2014/053685 filed on Dec. 12, 2014, which claims priority to GB1401169.6 filed Jan. 23, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The invention relates to loading, storing, transporting and unloading elongate products (such as subsea cables, umbilicals and flexible flow lines) on to or off floating vessels or tanks.

BACKGROUND OF THE INVENTION

Elongate products such as subsea cables, umbilicals and flexible flow lines are typically rolled or coiled to reduce their overall dimensions for storage and transportation.

For instance, they are often loaded into a storage tank or reel which is rotated to receive the linearly delivered product. Where the axis of rotation is vertical the storage tank is typically referred to as a carousel or turntable; where the axis of rotation is horizontal, the storage device would normally be a reel or drum.

Reels have a higher centre of gravity than carousels and transportable reel designs are typically up to 10 m in diameter with up to around 400 tonnes of storage capacity. Carousels however may have a much larger size and capacity and may be up to 32 m in diameter and have up to around 7,000 tonnes storage capacity.

Most carousels are fitted onto the ground or deck of a transport vessel and supported by an array of low friction support wheels and drives. However, due to the substantial loads involved and the size, such arrangements are generally complicated and costly to produce and maintain. An alternative is to float the storage tank avoiding the need to support the weight of the tank and loaded product on a series of low friction supports. The water supports the weight of the storage tank and provides a low friction support to allow the tank to be rotated without complex bearings. To rotate, the tank, a rotational drive mechanism can be fitted on the quayside.

One example of such an arrangement is shown in patent Japanese patent number JPS64287 (application number 55-177732—Sanoyasu Dockyard). This arrangement uses a circular barge which is held against rollers mounted on a quayside, so that the barge can be rotated whilst it is being loaded from the quayside.

However there are disadvantages to such an arrangement. Civil and mechanical engineering works are required on the quayside, which may not be permitted or welcomed by port authorities and may add to the transportation costs. The drive and restraint mechanism would need to allow changes in height between the tank and the quayside, such as due to changes in the water level due to tides. The arrangement shown in JPS64287 is arranged to load a tank from the quayside, or vice versa, but it may be desirable to load the tank directly to or from a vessel without unloading onto the quayside as an interim stage.

It is therefore desirable to overcome or at least ameliorate some or all of these disadvantages with the prior art.

DISCLOSURE OF THE INVENTION

Therefore according to the present invention there is provided a cable loading structure for loading cable to or from a floating tank, said apparatus comprising: a floatable structure having a plurality of tank engaging means, wherein at least one of said tank engaging means is moveable between a first position and a second position such that in said first position said tank is moveable towards or away from said cable loading structure and in said second position, said tank is restrained against movement towards or away from said cable loading structure; and a drive system engageable with the tank so as to rotate the tank.

With this arrangement, a cable storage tank can be received and loaded or unloaded without the need for specialist additional infrastructure on a quay or vessel to control the loading operation. By using a floating structure and a floating tank, the substantial weight of the tank is borne by the floatation on the water. This also avoids the need for any complex bearing arrangement to allow the tank to rotate to load or unload a cable. As the structure is also floating there is no issue with the height of the tank varying due to tidal movements as the structure will move broadly in tandem with the tank.

However the height of the tank may vary relative to the cable loading structure as the weight of cable stored in the tank changes during loading or unloading, and there may be variations in pitch and roll between the cable loading structure and the storage tank as each structure responds differently to the impact of wave and winds. Consequently the tank is preferably not rigidly engaged with the structure, particularly in the vertical plane, to allow for these variations.

The cable loading structure may incorporate variable buoyancy to broadly match the variation of height of the tank caused by changes in the weight of cable stored during loading and unloading operations.

By engaging the tank with the structure, they can also be moved around together. This allows the tank and cable to be transported without having to unload and also without needing the infrastructure for unloading at the destination as this is provided by the cable loading structure itself.

Preferably the drive system uses one or more of the tank engaging means. In this way the tank engaging means can be used to rotate the tank during loading/unloading avoiding the need for further external means to rotate the tank.

The drive system is preferably arranged to engage the outer periphery of the tank. In this way, the engaging means can be biased against the tank to achieve a frictional force for the drive to be applied. Additionally, less force is needed to drive the outer periphery than trying to provide a drive to the inner parts of the tank or using a drive on the axis of the tank. This arrangement will also accommodate some limited slip due to relative movement of the tank and structure due to swell etc. This avoids the need for an accurately keyed drive mechanism.

The cable loading structure may include a loading arm arranged to transfer cable into or out of the tank. In this way, the cable loading structure can accurately position the cable in the tank and deliver the cable at the most appropriate location. For example, the cable may need to be delivered to a quayside which is higher than the tank level or alternatively, it may need to be delivered into the sea for direct laying on the seabed. By providing a loading arm on the structure, the self-sufficiency of the cable loading structure is enhanced.

The cable loading structure may be self-propelled to allow it to be moved independently either for small movements such as engaging with a tank or even for long distance transportation, without the need for additional vessels or tugs. Equally, the structure may be unpowered and be maneuvered into position by tugs and towed for longer distance movements.

The cable loading structure may have a generally U-shaped configuration with a main body and two arms defining a reception region for receiving a tank. Preferably, the at least one moveable tank engaging means includes a one moveable tank engaging means on one of the arms and one moveable tank engaging means on the other of said arms.

Alternatively, the cable loading structure may include a main body where the at least one moveable tank engaging means includes one or more arms pivotally arranged on the main body, wherein the one or more arms, in said second position, engage one side of the tank whilst the main body engages the opposite side of the tank. This allows the tank to be gripped between the main body and the moveable means to retain it in position. This can be achieved with a single arm or with two or more arms.

One or more of the tank engaging means can be provided on said main body. And similarly one or more may be provided on the arms, where present.

Preferably, the tank engaging means are resiliently biased into engagement with the tank. In this way, when the tank is in the retained position, the tank engaging means are loaded against this resilience which will tend to increase the force applied to the tank and increase the reliability of the engagement between the tank and structure. It also increases the frictional force between the two such that any driving force applied to the tank can be transferred without slipping.

Preferably, the cable loading structure includes at least one actuation device to capture and release the floating cable tank.

During cable loading and unloading operations between the cable loading structure and vessel or quayside, it is desirable for the cable loading structure to stay on station and provide torque reaction so that it is the cable tank that rotates in preference to the cable loading structure. To achieve this the cable loading structure may be moored to a quayside or alongside another vessel for loading and unloading operations, or alternatively the cable loading structure can be held on station and provide torque reaction by an anchoring system to the seabed or the use of spud poles fixing the cable loading structure to the seabed Optionally, the cable loading structure is fitted with an over-boarding arrangement to enable cable to be laid onto the seabed or picked up from the seabed.

The present invention also provides a cable loading method for loading cable to or from a floating tank, comprising providing: a floatable structure having a plurality of tank engaging means, wherein at least one of said tank engaging means is moveable between a first position and a second position such that in said first position said tank is moveable towards or away from said cable loading structure and in said second position, said tank is restrained against movement towards or away from said cable loading structure; a drive system on said floatable structure engageable with the tank and rotating the tank; and a tank, the method further comprising: moving said moveable engaging means into said first position; moving said tank into engagement with said floatable structure; moving said moveable engaging means into said second position to engage said tank; driving said tank to rotate within said floatable structure; and feeding cable to or from the tank via the floatable structure.

DESCRIPTION OF THE FIGURES

The invention will now be described in detail by reference to the accompanying drawings in which.

DETAILED DESCRIPTION

Figure 1:
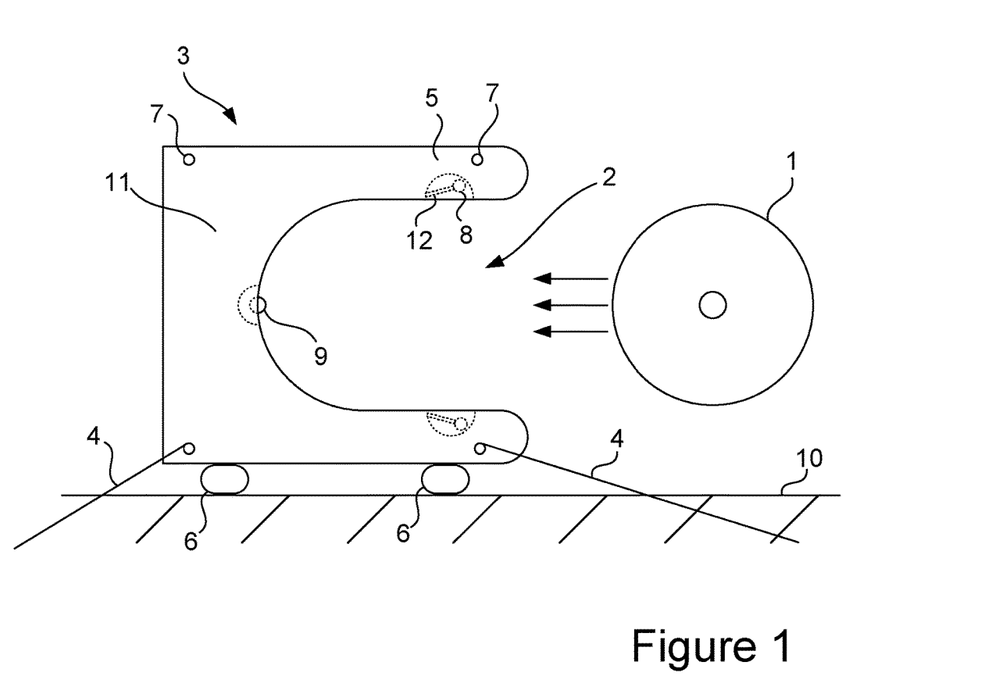
FIG. 1 shows a plan view of the cable loading structure of the present invention.

Prior to loading or unloading a cable from a cable storage tank 1, the tank needs to be positioned in the loading bay area 2 of the cable loading structure 3 (see FIG. 1). This may be achieved by maneuvering the tank whilst the cable loading structure 3 is moored for example against a harbour wall, a quay, another vessel or at an anchorage. Equally, the cable loading structure 3 may be maneuvered into position whilst the tank is substantially stationary.

FIG. 1 shows a plan view of a tank 1 and a cable loading structure 3. In this example, the cable loading structure 3 is tied up alongside a quay 10. Initially, the tank is not engaged with the structure 3 but is being brought towards it to be received in the loading bay area 2.

The floating cable tank 1 may be pushed by tug (not shown) and/or pulled by lines (not shown) into the loading bay area 2 of the cable loading structure 3. The cable loading structure 3 is moored, via lines 4 from bollards 7, against the quayside using suitable fenders 6.

As can be seen in FIG. 1, the cable loading structure 3 has a generally U-shaped form including two arms 5 extending away from the main body 11 of the cable support structure. This U-shape defines the loading bay area 2 for receiving the tank 1. The cable loading structure 3 incorporates retractable guides 12 provided on the arms 5 on each side of the structure 3. Each guide 12 includes a rotatable support 8 provided for engaging the tank 1. The guides are retractable into the arms, so that the tank can pass between them uninhibited. The two arms 5 may be linked by a stiffener beam (not shown) at their outboard ends above the tank entry area to maintain the rigidity of the structure.

The main body 11 may be a purpose built structure or may be constructed from a series of standard interlocking pontoon sections (also known as 'combifloats' or 'unifloats').

The main body 11 also includes a fixed support 9 which is rotatable. As the tank is moved towards the structure 3, it passes between the arms 5 and towards the fixed support 9. Eventually, the leading edge of tank comes into contact with the fixed support 9. Once the tank is in this position, the guides 12 are moved from their retracted position so that the rotatable supports 8 engage the sides on the tank, as shown in FIG. 2.

Figure 2:
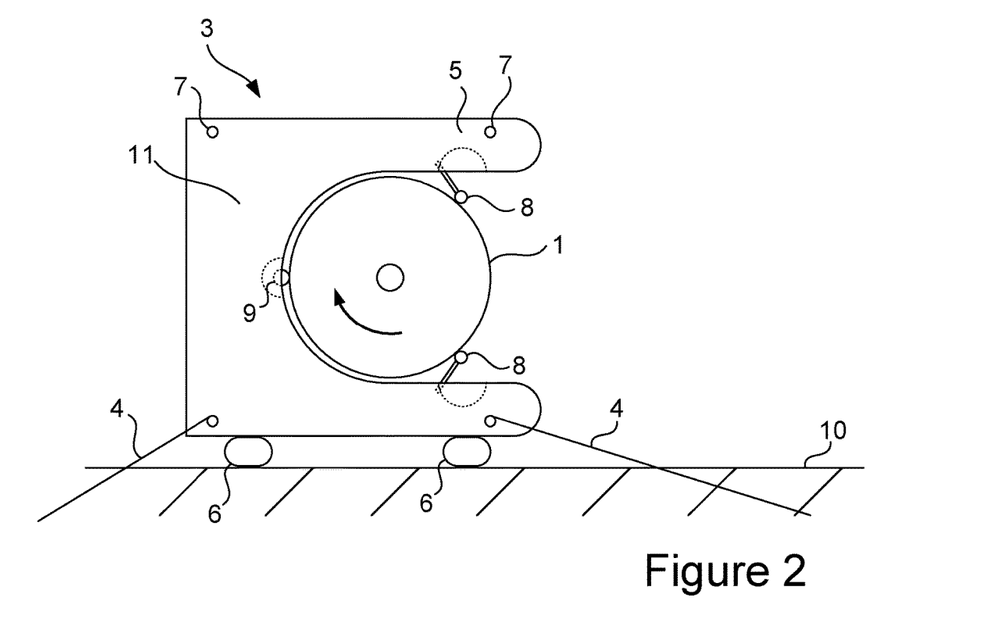
FIG. 2 shows a plan view of the cable loading structure of the present invention engaged with a storage tank.

As can be seen in FIG. 2, the two rotatable supports 8 and the fixed support 9 provide three points of contact around the periphery of the tank to hold the tank in engagement with the cable loading structure 3.

As both the tank and the cable loading structure are afloat, they may experience different forces due to movement of the water around them, e.g. swell. This may lead to relative pitch, roll and vertical movement of the tank and cable loading structure. Also any variation in the dimensions of the tank as it rotates, may result in the relative spacing of the supports 8, 9 changing as the tank rotates.

The supports 8 and 9 may therefore be provided with a degree of resilience to accommodate relative movement of the tank 1 and structure 3. This resilience may be provide by for example spring loading the guides 12 and/or using a deformable material on the supports 8 or 9. This helps to force the drive wheels against the periphery of the cable tank 1 to ensure that the tank and supports remain in contact for frictional drive, to account for relative pitch, roll, vertical movement and structural out-of-roundness, between the cable loading structure 3 and the tank 1.

In this example, the fixed support 9 includes means for driving it, for example by a hydraulic or electric drive. However, one or both of the rotatable supports 8 may be driven as well as or instead of the fixed support 9. FIG. 2 shows the tank 1 fully engaged in the cable loading structure 3 and the retractable rotating supports 8 extended to retain the tank 1 in position. The fixed support 9 is in engagement with the side of the tank and as it driven, the tank is caused to rotate about its central vertical axis guided by the supports 8.

The cable loading structure may include a generator or hydraulic power pack (not shown) for actuation of the rotating supports, actuation of the driven support 9 and also a braking mechanism as well as other functions such as moving the cable and control of a loading arm, described in more detail below. Alternatively, the various elements may be driven electrically or hydraulically from a supply on the cable loading structure itself or provided to it from another vessel or from the shore.

Once the tank 1 is captured by the cable loading structure 3, the fixed support 9 can be driven to rotate the tank relative to it. A cable can then be fed to the cable loading structure to be feed into the tank as it rotates. This allows the cable to be reeled into the tank.

Once the tank is fully loaded with the cable to be carried or the cable has been fully unloaded, the tank 1 can be released from the cable loading structure 3 and towed out of the loading bay area 2. Alternatively, the tank may be retained engaged with the cable loading structure to be transported to a new location.

With this arrangement, the tank can be transported independently of the cable loading structure or transported together in engagement. This provides great flexibility in loading and unloading of cables without the need for complex and expensive infrastructure at the cable destination and intermediate points. The cable can be loaded into a tank at the initial port by bringing it into engagement with a cable loading structure and then loaded up. The tank may then be separately transported to a further destination where it can again be engaged with a cable loading structure. The combination may then be transported to an offshore site such as a wind farm or oil production facility where the cable loading structure 3 can offload the cable and then transport the empty tank to a further location. Both the tank and cable loading structure may then be reused later.

Figure 3:
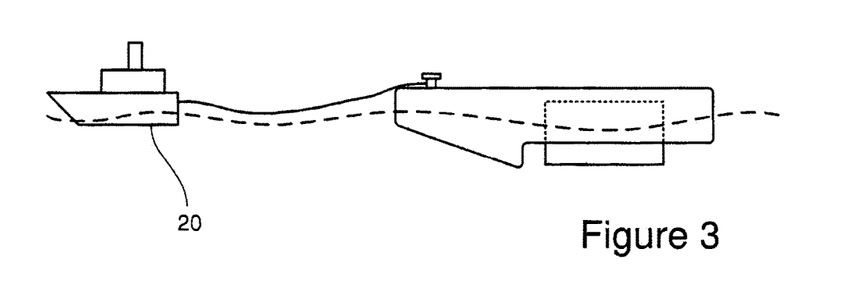
FIG. 3 shows a side view of the cable loading structure of the present invention engaged with a storage tank and under tow.

FIG. 3 shows a side elevation with the cable loading structure 3 and a captured tank 1 being towed by tug 20 using a tow line attached on to tow bollards 7. In this arrangement, the cable loading structure does not have motive power to move itself but relies on a tug, although it may include engines for maneuvering or to make way under its own power.

Figure 4:
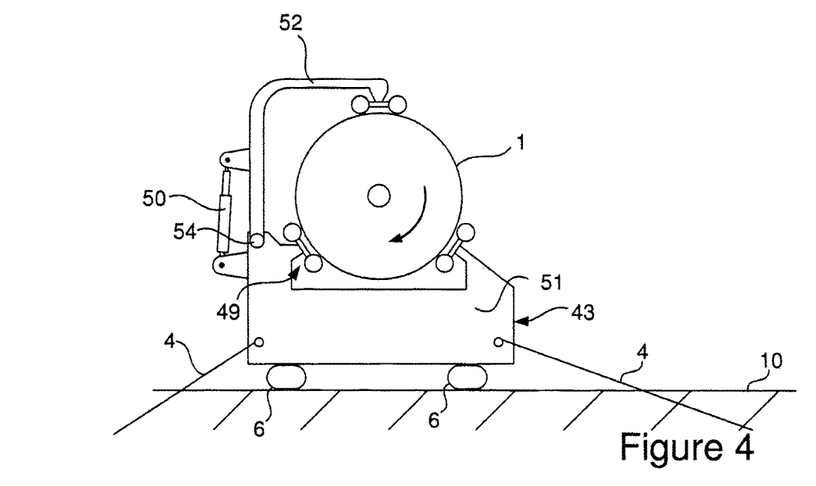
FIG. 4 shows a plan view of a second embodiment of the cable loading structure of the present invention.

FIG. 4 shows an alternative arrangement according to the invention. The cable loading structure 43 has two support elements 49 provided at the front of the main body 51 of the cable loading structure 43, each having a pair of rotatable wheels 55 arranged to receive a tank between them.

A pivotable arm 52 is provided on one side of the cable loading structure 43. The arm is mounted on a pivot 54 so that it can be moved from a fully engaged position, as shown in FIG. 4 to an open position. The arm is moveable under the action of a hydraulic ram 50 mounted to the side of the structure 43. With the pivotable arm 52 in the open position, the tank can be withdrawn away from the rotatable wheels 55 on the support elements 49 without the pivotable arm 52 obstructing it. Similarly, when it is desired to engage a tank with the structure 43, a tank can be brought up to abut the wheels 55.

Once the tank 1 is in position abutting the rotatable wheels 55 on each of the support elements 49, hydraulic ram 50 is used to return the rotatable arm 52 to the closed position. The arm 52 is also provided with at least one support element 48 with rotatable wheels 55 also mounted on it. As the arm is brought into its closed position, the wheels 55 engage the tank to push it against the wheels 55 on the support elements 49. This captures the tank so that it is engaged with the cable loading structure 43. In a similar manner to the embodiment above, at least one of the rotatable wheels 55 is driven to rotate the tank 1. The force between the wheels of the support elements ensures that the friction between them and the tank causes it to rotate.

Figure 5:
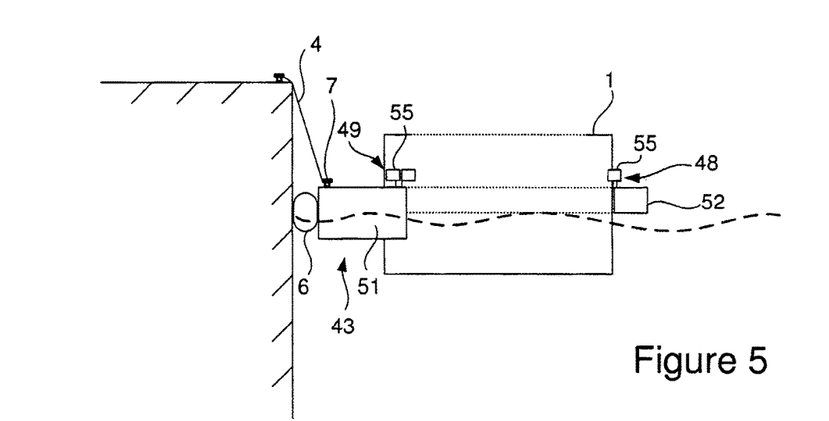
FIG. 5 shows a side view of the second embodiment of the cable loading structure of the present invention.

FIG. 5 shows a side view of the structure and tank of FIG. 4. The above arrangement may again be used at a quayside 10, as shown in FIGS. 4 and 5, alongside another vessel or at an anchorage.

Figure 6:
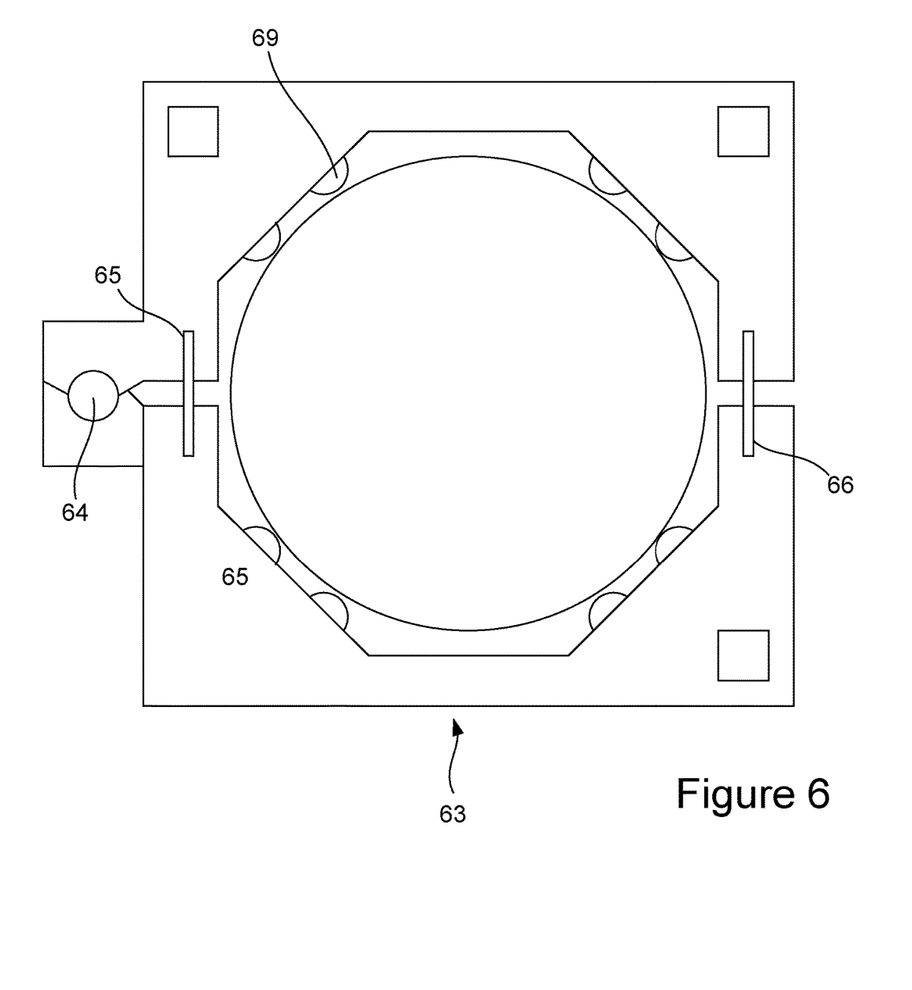
FIG. 6 shows a plan view of a third embodiment of the cable loading structure of the present invention.

FIG. 6 shows a further embodiment of the present invention. In this arrangement, the cable loading structure 63 is formed in two halves pivoted around a pivot 64. The two halves can be moved apart to provide an access space for the tank to be introduced into the mouth of the structure. The two halves are then brought back together capturing the tank.

In a similar manner to the other embodiments, rotatable wheels 69 are provided at each side of the two halves of the structure which engage the outer surface of the tank. One of more of the wheels 69 may be driven to rotate the tank. The wheels are resiliently mounted to bias then towards the tank. In this way as the two halves close around the tank, the wheels are forced into intimate engagement with the tank to ensure good transmission of the driving force from the driven wheels to the tank.

A drive mechanism 65 is provided adjacent to the pivot to push and pull the two halves of the structure away from or towards each other.

A latch mechanism 66 is provided on the outer parts of the two halves on the side opposite to the pivot. This latching mechanism can be used to hold the two halves together and also to ensure that the two halves are close enough together that the resilience in the mountings of the wheels provides sufficient force to maintain the frictional contact between the wheels and the tank.

Figure 7:
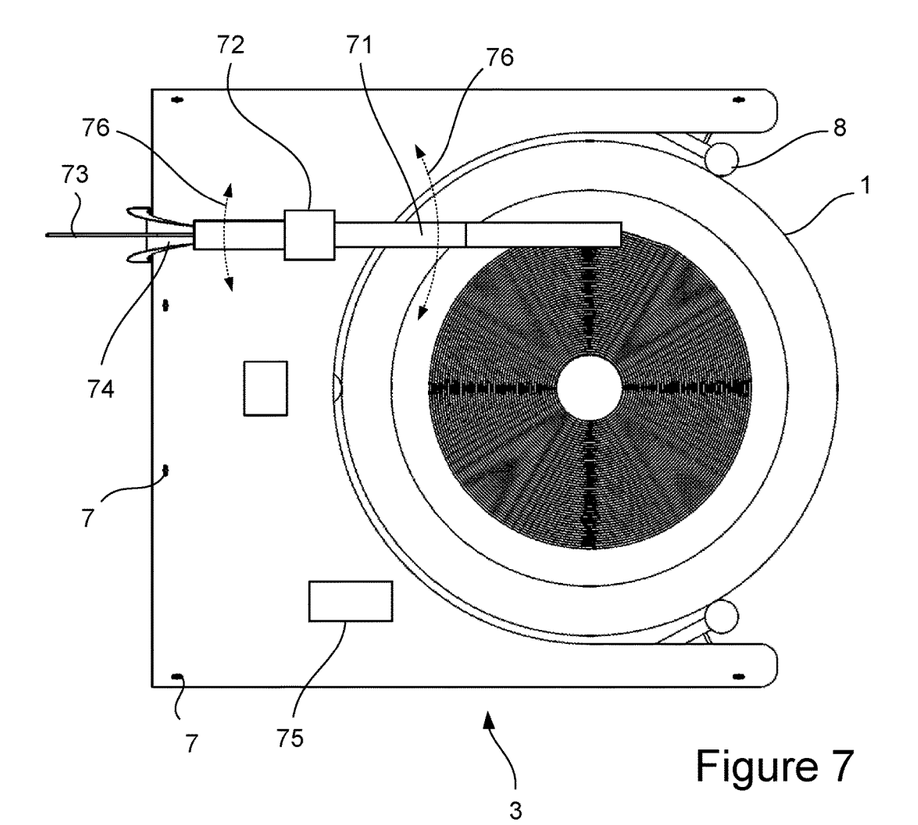
FIG. 7 shows a more detailed plan view of the cable loading structure of the present invention.
Figure 8:
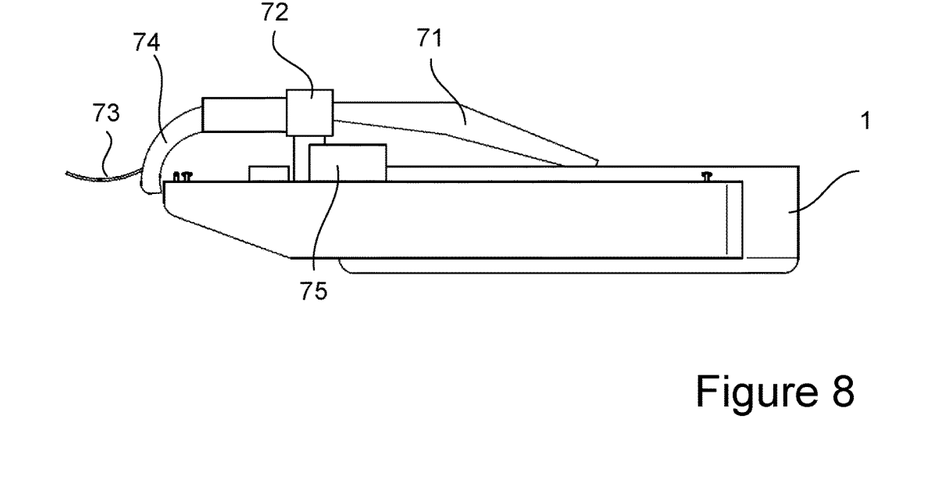
FIG. 8 shows a side view of the structure of FIG. 7.

The figures of the embodiments above do not show any of the cable management equipment used for moving the cable in and out of the tank. In order to allow independent operation and also to aid reliable placement of the cable in the tank, it is desirable to have cable management equipment on the cable loading structure. FIGS. 7 and 8 show a more detailed view of the first embodiment showing a cable loading/unloading arm 71 which is mounted on a pivotable turret 72.

For loading operations, the cable 73 is fed from a quayside supply or from an adjacent vessel into the cable receiving chute 74. The cable is then fed along the loading/unloading arm 71 and into the tank. The cable loading/unloading arm 71 may include a wheeled or tracked linear cable engine (not shown) to facilitate cable transfer. As the cable is fed in, the arm 71 is rotated (see arrows 76) so that the cable is laid in the suitable position radially across the tank for proper loading of the tank. In this way, the cable can be layered on top of itself as it is fed into the tank.

Additional equipment such as a power generation and/or management system 75 is provided on the main body of the cable loading structure 3. This equipment can be used to control the operation of the loading/unloading arm, the engagement of the drive wheels 8, and winching of the tank into position in the structure.

Figure 9:
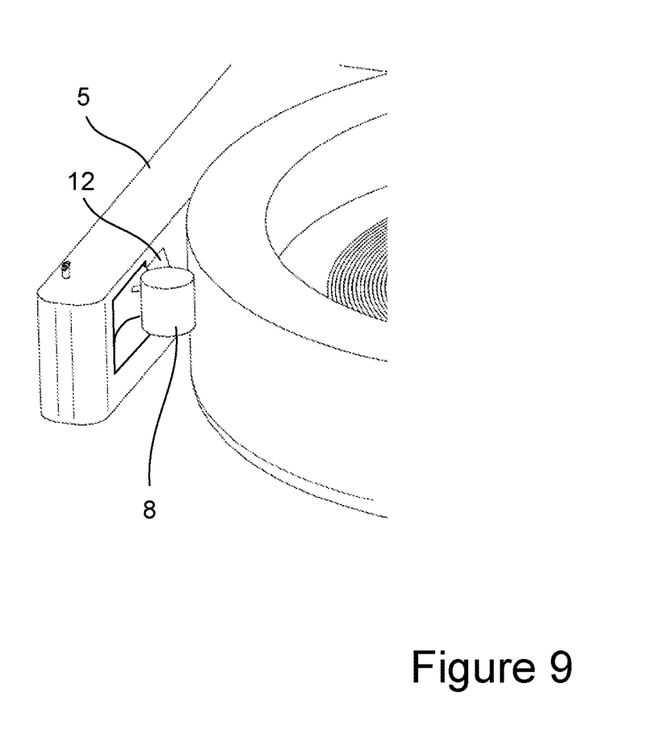
FIG. 9 shows a partial detail view of the arrangement of FIG. 7.

FIG. 9 shows a close up view of the support 12 and wheels 8 shown in FIGS. 1, 2 and 8.

Figure 10:
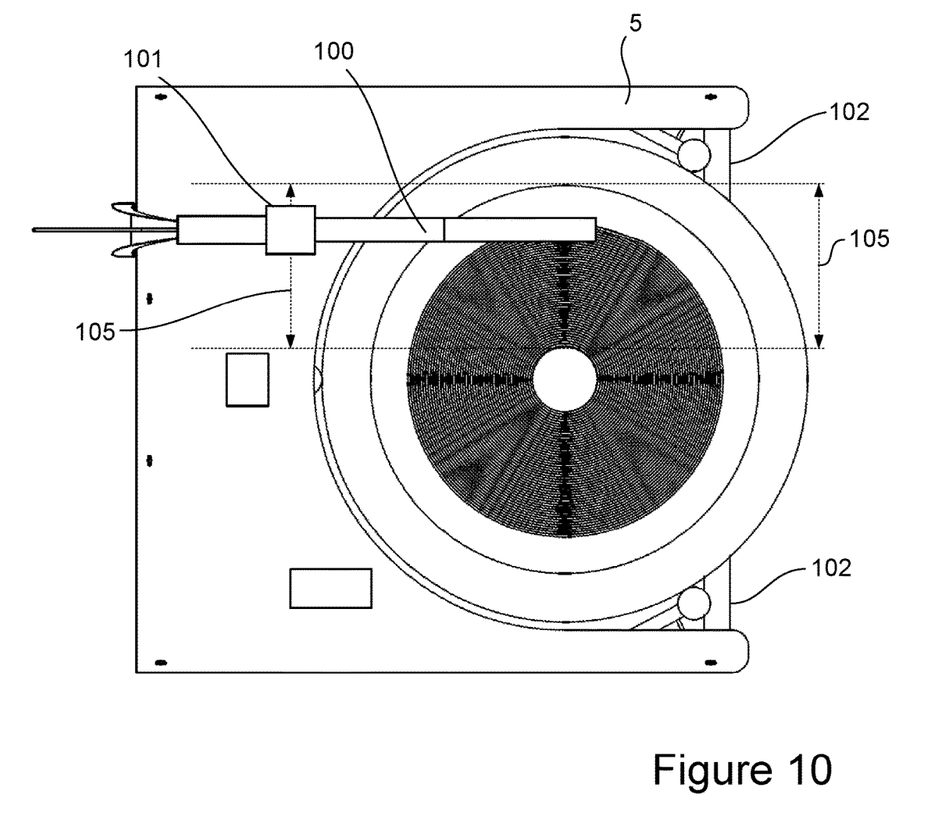
FIG. 10 shows a plan view of a further cable loading structure of the present invention.
Figure 11:
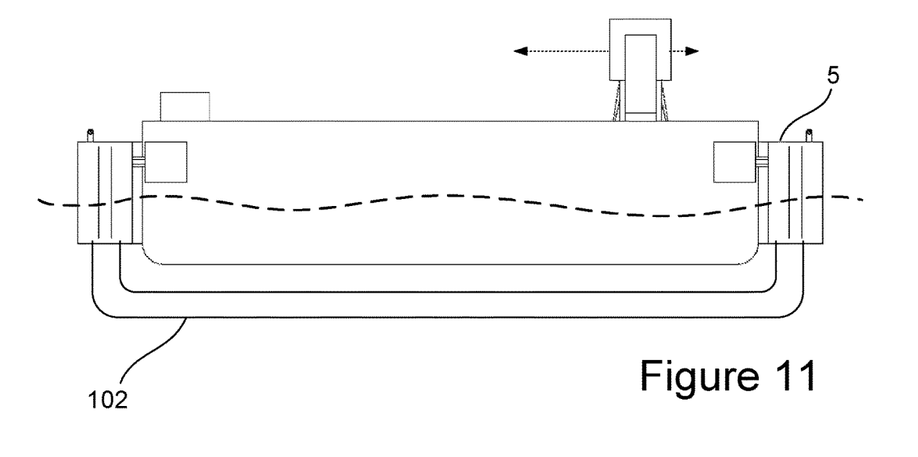
FIG. 11 shows a side view of the structure of FIG. 10.

FIGS. 10 and 11 show another modification of the first embodiment with a cable loading/unloading arm 100 mounted so as to be linearly slideable (the arm may optionally be rotatable as well), so that the end can be moved across the usable diameter of the tank to place the cable appropriately. The arm 100 is mounted on a turret 101 which can be translated up and down the deck (see arrows 105) to move the entire arm to lay the cable in position. This linear movement can be advantageous as the cable is delivered perpendicular to the radius of the tank which helps to lay the cable more reliably.

FIG. 11 also shows a stiffening beam 102 provided between the arms 5. This helps to maintain the rigidity of the structure to prevent the forces from the movement of the tank from pushing the arms apart and reducing the engagement of the tank with the structure. The stiffening beam may be omitted where it might obstruct the movement of the structure in shallower water. Alternatively, the stiffening beam 102 may be extend between the arms but above the tank entry area. This would ensure that there was no risk of the beam running aground or striking the tank, as long as sufficient clearance between the top of the tank and the underside of the stiffening beam was provided.

The above embodiments have been described in relation to loading or unloading a cable to a quayside or a vessel. However, the cable loading structure of the present invention may also be used to directly unload a cable to lay on a seabed without the need to tranship it to another vessel first. In this way, the loaded tank can be introduced to the cable loading structure which can then be moved to position and then towed as the cable is released to be laid on the seabed. This avoids the need to move the cable from a tank to a dedicated cable laying vessel. A standard tug could be used to tow the cable loading structure with the necessary equipment provided on the cable loading structure itself.

Figure 12:
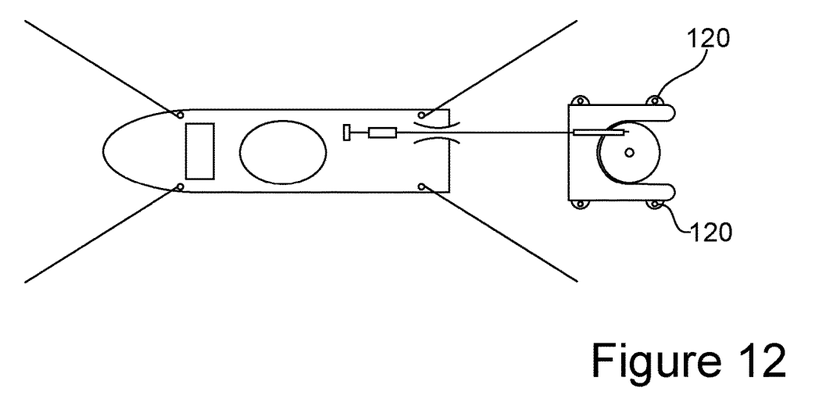
FIG. 12 shows a structure according to the present invention being operated in open water loading or unloading cable to or from a vessel.
Figure 13:
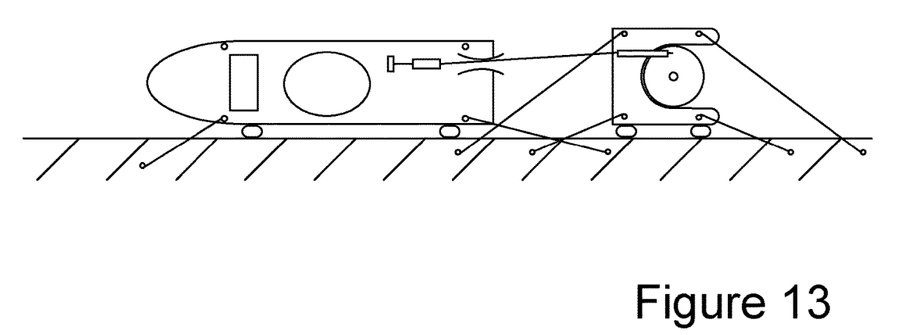
FIG. 13 shows a structure according to the present invention being operated on a quay side loading or unloading cable to or from a vessel.
Figure 14:
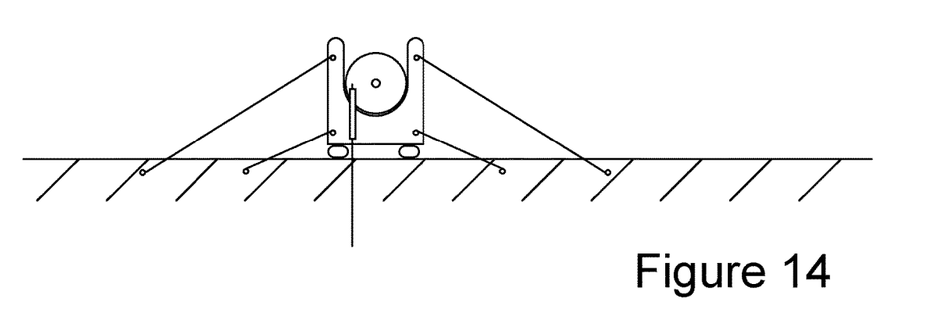
FIG. 14 shows a structure according to the present invention being operated for loading/unloading cable onto a quay side.

FIGS. 12 to 14 show different possible configurations of the cable loading structure of the invention. FIG. 12 shows the cable loading structure held on spud poles 120 or at anchor whilst a cable is loaded or unloaded from the nearby vessel which is also at anchor. The cable loading structure is arranged so that the cable is fed from the rear of the cable loading structure directly onto the vessel. This arrangement may be used to move the cable at sea, to a vessel for laying or further distribution or the vessel may be delivering the cable to be moved to the tank for onward transportation.

FIG. 13 shows use of the cable loading structure to transfer a cable to or from a vessel but with both tied up to a quay. Again the cable loading structure is oriented to allow direct transfer of the cable from the tank to the vessel without the need for any infrastructure on the quayside and without the need for the cable to be routed via the quayside.

FIG. 14 shows the cable loading structure tied up to a quay but in this arrangement, it is oriented so that the cable is transferred to or from the quayside. No vessel is required in this example and the cable can be loaded directly from a land based source. This may be a tank or carousel or possibly even directly from the manufacturing facility.

The above embodiments show a number of arrangements of the present invention but it will be appreciated that there are many variants which may include combinations of the features described. For example, any number of wheels may be employed to retain the tank in its captured position and it is not intended that the invention be limited to having three or four sets of single or pairs of wheels. The invention is equally applicable to multiple sets of single of multiple wheels. Typically rotatable wheels are preferred to reduce friction but other means of retaining the tank may be utilised, including simple fenders and so on.

Various methods of opening the cable loading structure to receive the tank have been described and again, other variations are possible within the scope of the invention as long as it allows the tank to be received into the structure and then retained to allow it to be rotated.

The above embodiments refer to loading or unloading cables but the present invention may be used for other elongate items, for example, umbilicals and flow lines. References to cables in this document should be interpreted to include such other elongate items.

Similarly, the above description refers to the cable storage device as a tank. References to tanks are intended to cover any kind of floatable containment structure in which a cable may be stored. The tank does not need to be water tight and may in fact allow water to partially fill it whilst remaining afloat, for example using buoyancy tanks.

The invention claimed is:

1. A cable loading structure for loading cable to or from a floating tank, the outer periphery of the floating tank being generally circular around a vertical axis of the floating tank, said cable loading structure comprising:

a floatable structure having a plurality of tank engaging members, wherein at least one of said tank engaging members is moveable between a first position and a second position such that in said first position said tank is moveable towards or away from said cable loading structure and in said second position, said tank is restrained against movement towards or away from said cable loading structure; and a drive system frictionally engageable with the outer periphery of the tank so as to rotate the tank;

wherein said cable loading structure has a main body and two arms defining a reception region for receiving the tank.

2. The cable loading structure according to claim 1 wherein said at least one moveable tank engaging member includes a first moveable tank engaging member on a first of said arms and a second moveable tank engaging member on a second of said arms.

3. The cable loading structure according to claim 1 wherein the drive system includes one or more of said tank engaging members.

4. The cable loading structure according to claim 1 wherein the cable loading structure further includes a loading arm arranged to transfer cable into or out of the tank.

5. The cable loading structure according to claim 1 wherein the cable loading structure is self-propelled.

6. The cable loading structure according to claim 1 wherein the cable loading structure further comprises one or more anchoring lines for holding the cable loading structure on station and to provide torque reaction.

7. The cable loading structure according to claim 1 wherein said tank engaging members are resiliently biased into engagement with said tank.

8. A cable loading structure for loading cable to or from a floating tank, the outer periphery of the floating tank being generally circular around a vertical axis of the floating tank, said cable loading structure comprising:

a floatable structure having a plurality of tank engaging members, wherein at least one of said tank engaging members is moveable between a first position and a second position such that in said first position said tank is moveable towards or away from said cable loading structure and in said second position, said tank is restrained against movement towards or away from said cable loading structure; and a drive system frictionally engageable with the outer periphery of the tank so as to rotate the tank;

wherein said cable loading structure includes a main body and said at least one moveable tank engaging member includes one or more arms pivotally arranged on the main body, wherein said one or more arms, in said second position, engage one side of the tank whilst the main body engages the opposite side of the tank.

9. The cable loading structure according to claim 8 wherein one or more of said tank engaging members are provided on said main body.

10. The cable loading structure according to claim 8 wherein said tank engaging members are resiliently biased into engagement with said tank.

11. The cable loading structure according to claim 8 wherein the drive system includes one or more of said tank engaging members.

12. The cable loading structure according to claim 8 wherein the cable loading structure further includes a loading arm arranged to transfer cable into or out of the tank.

13. The cable loading structure according to claim 8 wherein the cable loading structure is self-propelled.

14. The cable loading structure according to claim 8 wherein the cable loading structure further comprises one or more anchoring lines for holding the cable loading structure on station and to provide torque reaction.

15. A cable loading method for loading cable to or from a floating tank, the outer periphery of the floating tank being generally circular around a vertical axis, the method comprising providing:

a floatable structure having a plurality of tank engaging members, wherein at least one of said tank engaging members is moveable between a first position and a second position such that in said first position said tank is moveable towards or away from said cable loading structure and in said second position, said tank is restrained against movement towards or away from said cable loading structure; and a drive system on said floatable structure frictionally engageable with the outer periphery of the tank for rotating the tank; and the method further comprising:

moving said moveable tank engaging member into said first position;

moving said tank into engagement with said floatable structure;

moving said moveable tank engaging member into said second position to engage said tank;

frictionally driving the sides of said tank to rotate within said floatable structure; and feeding cable to or from the tank via the floatable structure;

wherein said cable loading structure has a main body and two arms defining a reception region for receiving the tank.

16. A cable loading method for loading cable to or from a floating tank, the outer periphery of the floating tank being generally circular around a vertical axis, the method comprising providing:

a floatable structure having a plurality of tank engaging members, wherein at least one of said tank engaging members is moveable between a first position and a second position such that in said first position said tank is moveable towards or away from said cable loading structure and in said second position, said tank is restrained against movement towards or away from said cable loading structure; and a drive system on said floatable structure frictionally engageable with the outer periphery of the tank for rotating the tank; and the method further comprising:

moving said moveable tank engaging member into said first position;

moving said tank into engagement with said floatable structure;

moving said moveable tank engaging member into said second position to engage said tank;

frictionally driving the sides of said tank to rotate within said floatable structure; and feeding cable to or from the tank via the floatable structure;

and wherein said cable loading structure includes a main body and said at least one moveable tank engaging member includes one or more arms pivotally arranged on the main body, wherein said one or more arms, in said second position, engage one side of the tank whilst the main body engages the opposite side of the tank.

\* \* \* \* \*